(12) United States Patent
Raghavan et al.

(10) Patent No.: US 12,149,465 B2
(45) Date of Patent: Nov. 19, 2024

(54) REFERENCE SIGNAL CONFIGURATION AND QUASI CO-LOCATION MAPPINGS FOR WIDE BANDWIDTH SYSTEMS

(71) Applicant: QUALCOMM Incorporated, San Diego, CA (US)

(72) Inventors: Vasanthan Raghavan, West Windsor Township, NJ (US); Srinivas Yerramalli, Hyderabad (IN); Arumugam Chendamarai Kannan, San Diego, CA (US); Tao Luo, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 17/305,789

(22) Filed: Jul. 14, 2021

(65) Prior Publication Data

US 2022/0038235 A1 Feb. 3, 2022

Related U.S. Application Data

(60) Provisional application No. 63/057,621, filed on Jul. 28, 2020.

(51) Int. Cl.
*H04L 5/00* (2006.01)
*H04W 72/044* (2023.01)

(52) U.S. Cl.
CPC ......... *H04L 5/0048* (2013.01); *H04W 72/046* (2013.01)

(58) Field of Classification Search
USPC ........................................... 370/329
See application file for complete search history.

(56) References Cited

U.S. PATENT DOCUMENTS 11,153,134 B2 * 10/2021 Sun .................. H04L 25/03821
11,316,579 B2 * 4/2022 Guan .................... H04W 76/11
(Continued)

FOREIGN PATENT DOCUMENTS

| EP | 3565171 A1 | 11/2019 |
|---|---|---|
| WO | 2020000304 A1 | 1/2020 |

OTHER PUBLICATIONS

International Search Report and Written Opinion—PCT/US2021/070882—ISA/EPO—Oct. 15, 2021.

*Primary Examiner* — Jeffrey M Rutkowski
*Assistant Examiner* — Luna Weissberger
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates a set of frequency components for carrier aggregation and that indicates multiple sets of channel state information reference signals (CSI-RSs) or sounding reference signals (SRSs), wherein different sets of CSI-RSs or SRSs, of the multiple sets of CSI-RSs or SRSs, correspond to different subsets of frequency components included in the set of frequency components. The UE may monitor for one or more CSI-RSs or SRSs, corresponding to a subset of frequency components included in the set of frequency components, based at least in part on the configuration. Numerous other aspects are provided.

30 Claims, 11 Drawing Sheets

(56) References Cited

U.S. PATENT DOCUMENTS

| | | | |
|---|---|---|---|
| 2019/0229859 A1* | 7/2019 | Manolakos | H04W 56/00 |
| 2019/0281588 A1 | 9/2019 | Zhang et al. | |
| 2021/0152397 A1* | 5/2021 | Jiang | H04B 7/0695 |
| 2022/0132564 A1* | 4/2022 | Ouchi | H04W 72/0453 |

* cited by examiner

REFERENCE SIGNAL CONFIGURATION AND QUASI CO-LOCATION MAPPINGS FOR WIDE BANDWIDTH SYSTEMS

CROSS-REFERENCE TO RELATED APPLICATION

This patent application claims priority to U.S. patent application Ser. No. 63/057,621, filed on Jul. 28, 2020, entitled "REFERENCE SIGNAL CONFIGURATION AND QUASI CO-LOCATION MAPPINGS FOR WIDE BANDWIDTH SYSTEMS," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for reference signal configuration and quasi co-location mappings for wide bandwidth systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a configuration that indicates a set of frequency components for carrier aggregation and that indicates multiple sets of channel state information reference signals (CSI-RSs) or sounding reference signals (SRSs), wherein different sets of CSI-RSs or SRSs, of the multiple sets of CSI-RSs or SRSs, correspond to different subsets of frequency components included in the set of frequency components; and monitoring for one or more CSI-RSs or SRSs, corresponding to a subset of frequency components included in the set of frequency components, based at least in part on the configuration.

In some aspects, a method of wireless communication performed by a scheduling entity includes: transmitting a configuration that indicates a set of frequency components for carrier aggregation and that indicates multiple sets of channel state CSI-RSs or SRSs, wherein different sets of CSI-RSs or SRSs, of the multiple sets of CSI-RSs or SRSs, correspond to different subsets of frequency components included in the set of frequency components; and transmitting one or more CSI-RSs or SRSs, corresponding to a subset of frequency components included in the set of frequency components, based at least in part on the configuration.

In some aspects, a UE for wireless communication includes: a memory, and one or more processors coupled to the memory, the memory and the one or more processors configured to: receive a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and monitor for one or more CSI-RSs or SRSs, corresponding to a subset of frequency components included in the set of frequency components, based at least in part on the configuration.

In some aspects, a scheduling entity for wireless communication includes: a memory, and one or more processors coupled to the memory, the memory and the one or more processors configured to: transmit a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and transmit one or more CSI-RSs or SRSs, corresponding to a subset of frequency components included in the set of frequency components, based at least in part on the configuration.

In some aspects, a non-transitory computer-readable medium storing a set of instructions for wireless communication includes: one or more instructions that, when executed by one or more processors of a UE, cause the UE to: receive a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and monitor for one or more CSI-RSs or SRSs, corresponding to a subset of frequency components included in the set of frequency components, based at least in part on the configuration.

In some aspects, a non-transitory computer-readable medium storing a set of instructions for wireless communication includes: one or more instructions that, when executed by one or more processors of a scheduling entity, cause the scheduling entity to: transmit a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and transmit one or more CSI-RSs or SRSs, corresponding to a subset of frequency components included in the set of frequency components, based at least in part on the configuration.

In some aspects, an apparatus for wireless communication includes: means for receiving a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and means for monitoring for one or more CSI-RSs or SRSs, corresponding to a subset of frequency components included in the set of frequency components, based at least in part on the configuration.

In some aspects, an apparatus for wireless communication includes: means for transmitting a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; and means for transmitting one or more CSI-RSs or SRSs, corresponding to a subset of frequency components included in the set of frequency components, based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
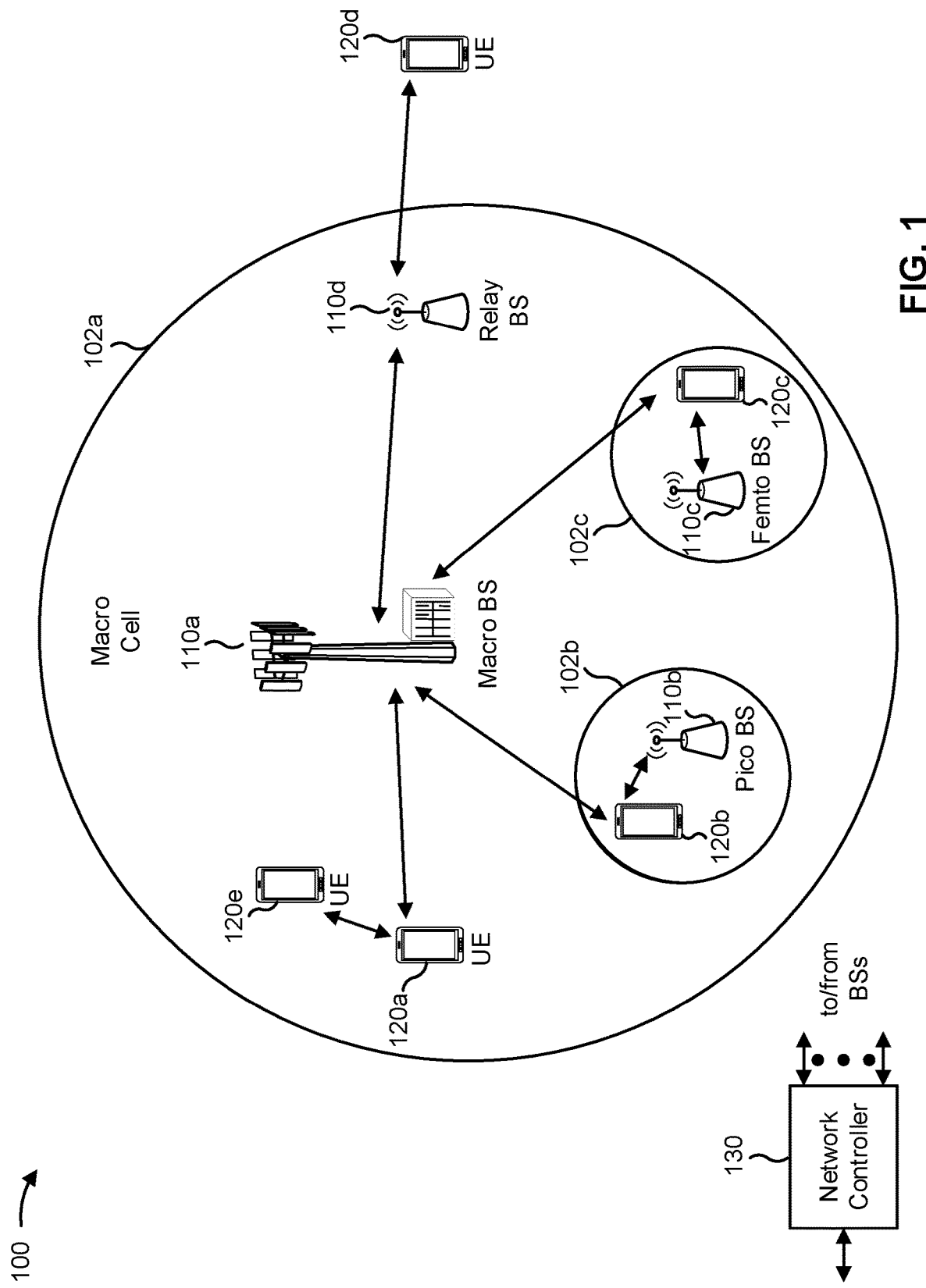
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
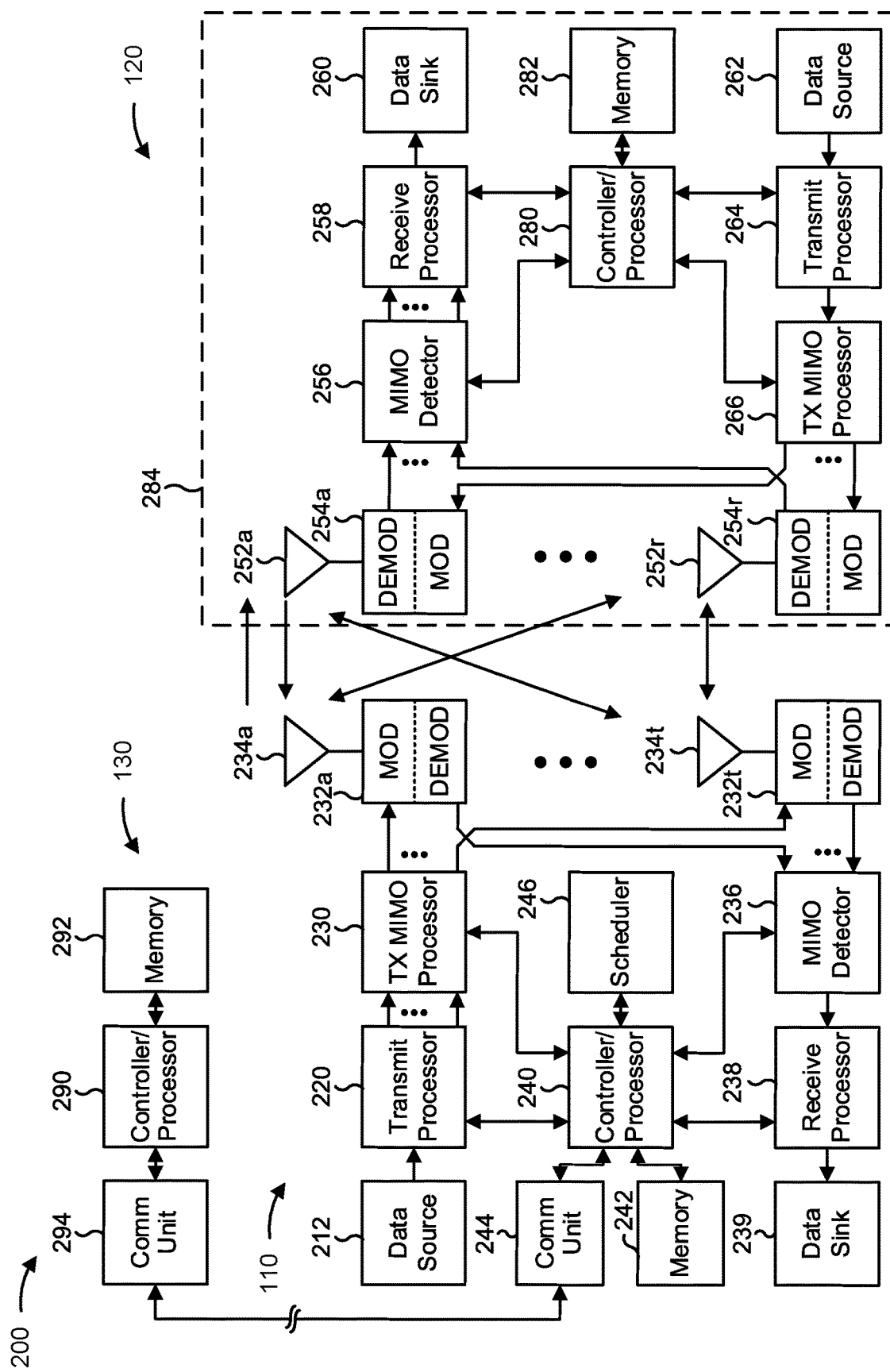
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-11).

Controller/processor 240 of base station 110, controller/processor 280 of UE 120, and/or any other component(s) of FIG. 2 may perform one or more techniques associated with reference signal configuration and QCL mappings for wide bandwidth systems, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a UE (e.g., UE 120) may include means for receiving a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; means for monitoring for one or more CSI-RSs or SRSs, corresponding to a subset of frequency components included in the set of frequency components, based at least in part on the configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a scheduling entity (e.g., base station 110, integrated access and backhaul (IAB) node, and/or the like) may include means for transmitting a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components; means for transmitting one or more CSI-RSs or SRSs, corresponding to a subset of frequency components included in the set of frequency components, based at least in part on the configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
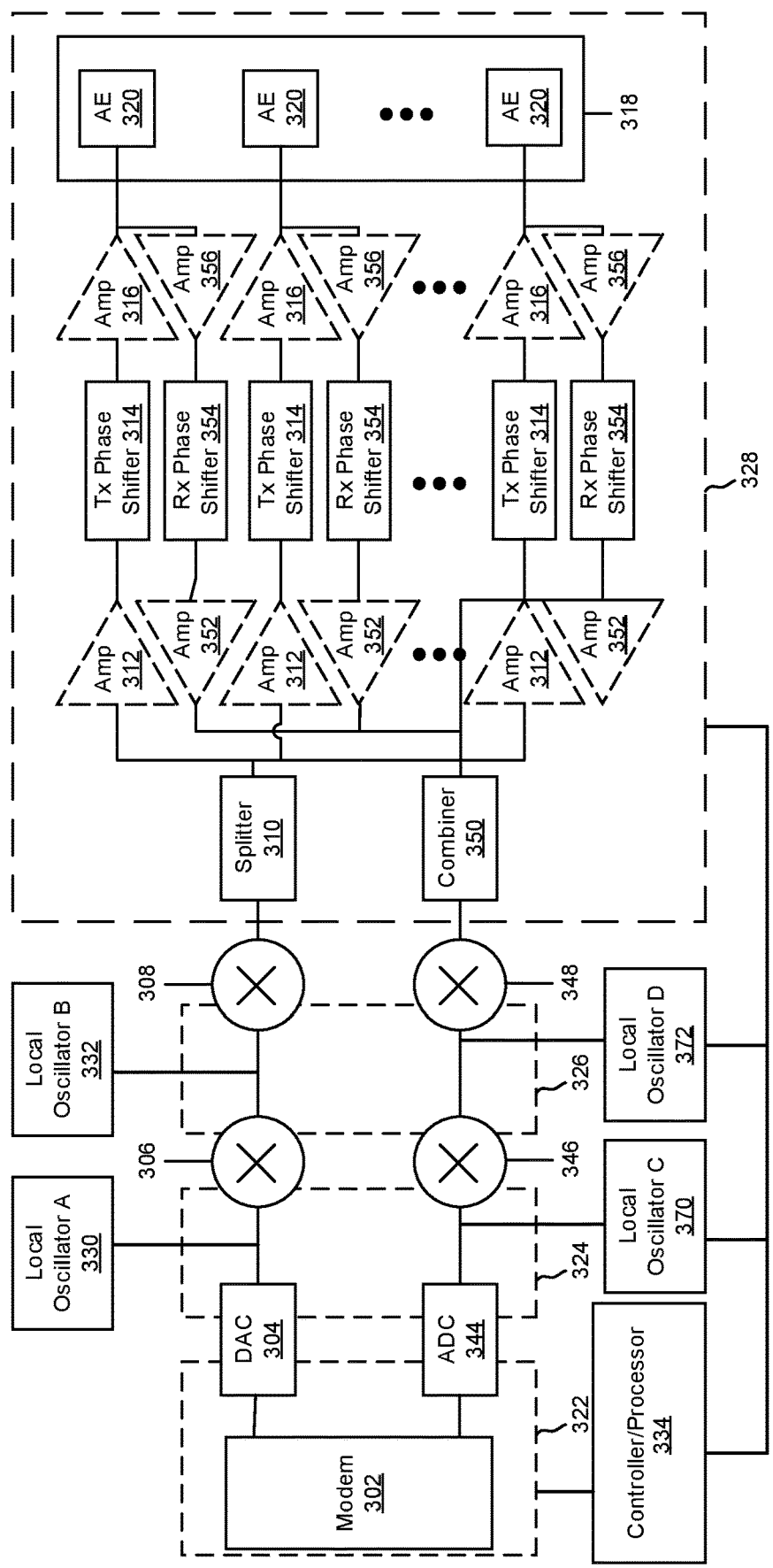
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
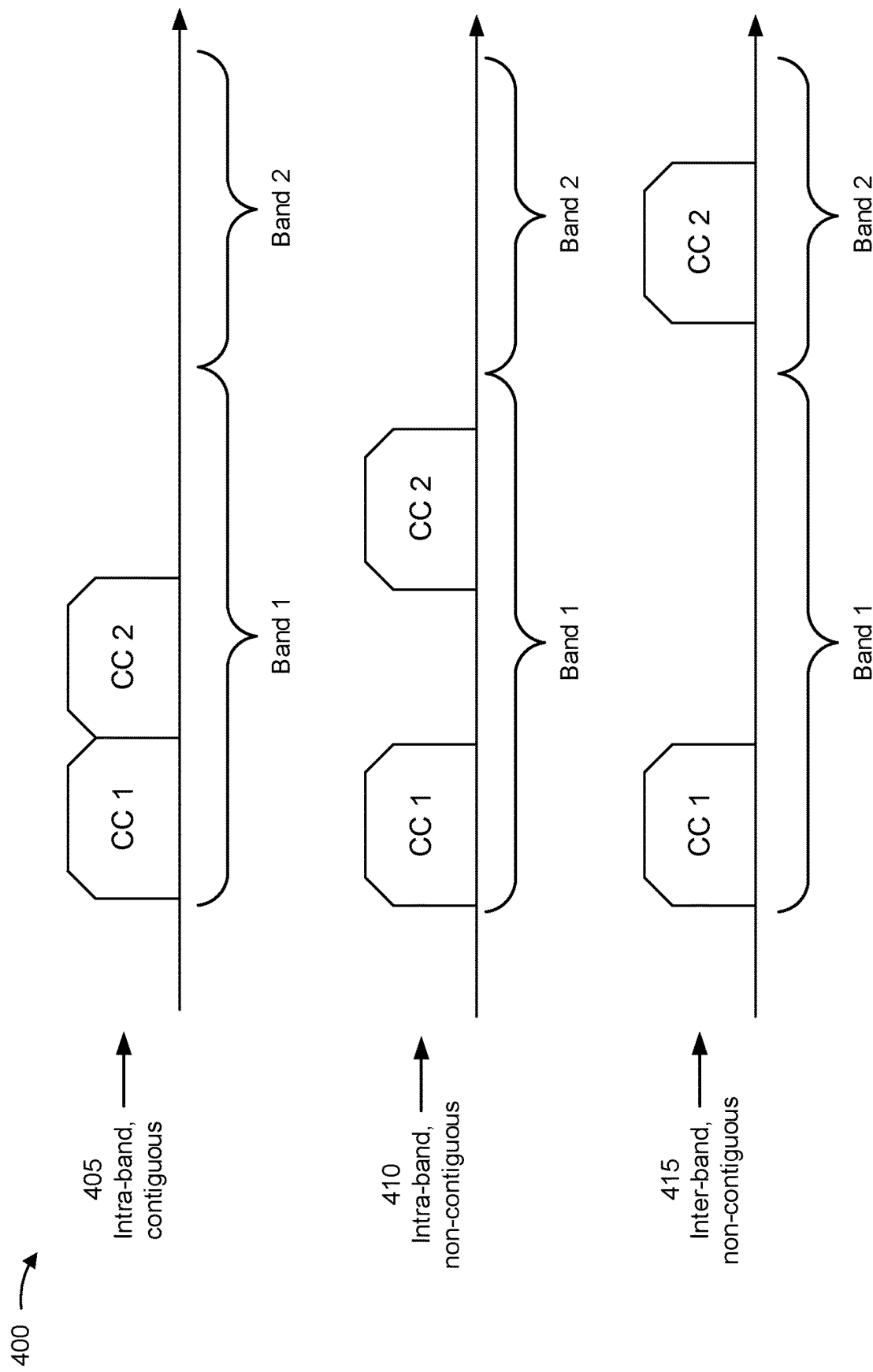
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or the like.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., downlink control information, scheduling information, and/or the like) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
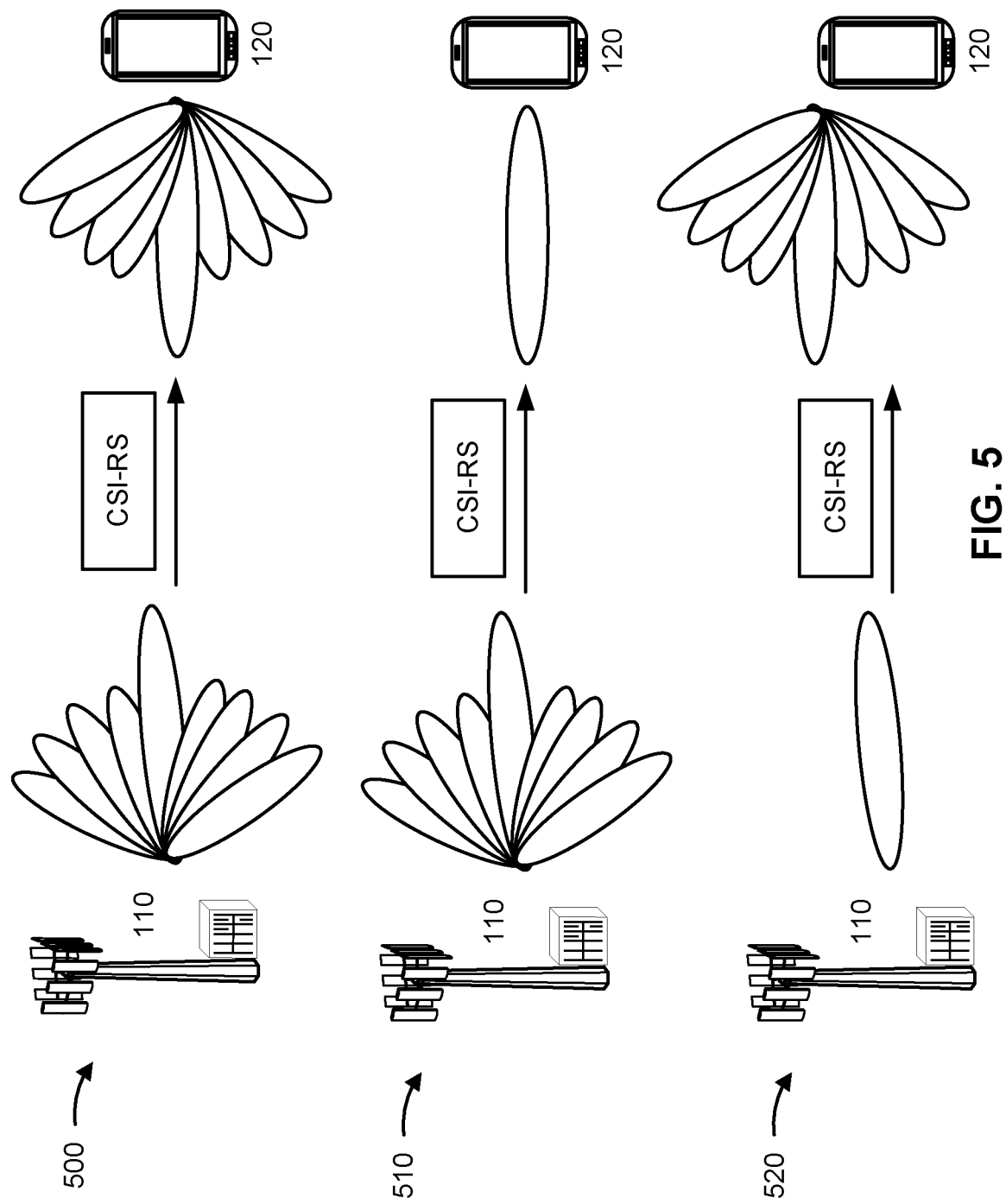
FIG. 5 is a diagram illustrating examples of channel state information reference signals (CSI-RS) beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or transmit receive point (TRP), between a mobile termination node and a control node, between an IAB child node and an IAB parent node, between a scheduled node and a scheduling node, and/or the like). In some aspects, the UE 120 and the base station 110 may be in a connected state (e.g., an RRC connected state and/or the like).

As shown in FIG. 5, example 500 may include a base station 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 5 and example 500, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using DCI and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, each CSI-RS on a transmit beam can be transmitted repeatedly multiple times in the same RS resource set so that the UE 120 can sweep through receive beams in multiple transmission instants. For example, if the base station 110 has a set of N transmit beams and the UE 120 has a set of M receive beams, the CSI-RS may be transmitted on each of the N transmit beams M times so that the UE 120 may receive M beams per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use SSBs for beam management in a similar manner as described above.

As shown in FIG. 5, example 510 may include a base station 110 and a UE 120 communicating to perform beam management using CSI-RSs. Example 510 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 5 and example 510, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on reported measurements received from the UE 120 (e.g., using the single receive beam).

As shown in FIG. 5, example 520 may depict a third beam management procedure (e.g., P3 CSI-RS beam management). The third beam management procedure may be referred to as a beam refinement procedure, a UE beam refinement procedure, a receive beam refinement procedure, and/or the like. As shown in FIG. 5 and example 520, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs on a single transmit beam (e.g., determined based at least in part on measurements reported by the UE 120 in connection with the first beam management procedure and/or the second beam management procedure). To enable the UE 120 to perform receive beam sweeping, the CSI-RS on the transmit beam can be transmitted repeatedly multiple times in the same RS resource set so that UE 120 can sweep through one or more receive beams in multiple transmission instants. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS on the transmit beam using the one or more receive beams).

As indicated above, FIG. 5 is provided as an example. Other examples may differ from what is described with respect to FIG. 5.

Figure 6:
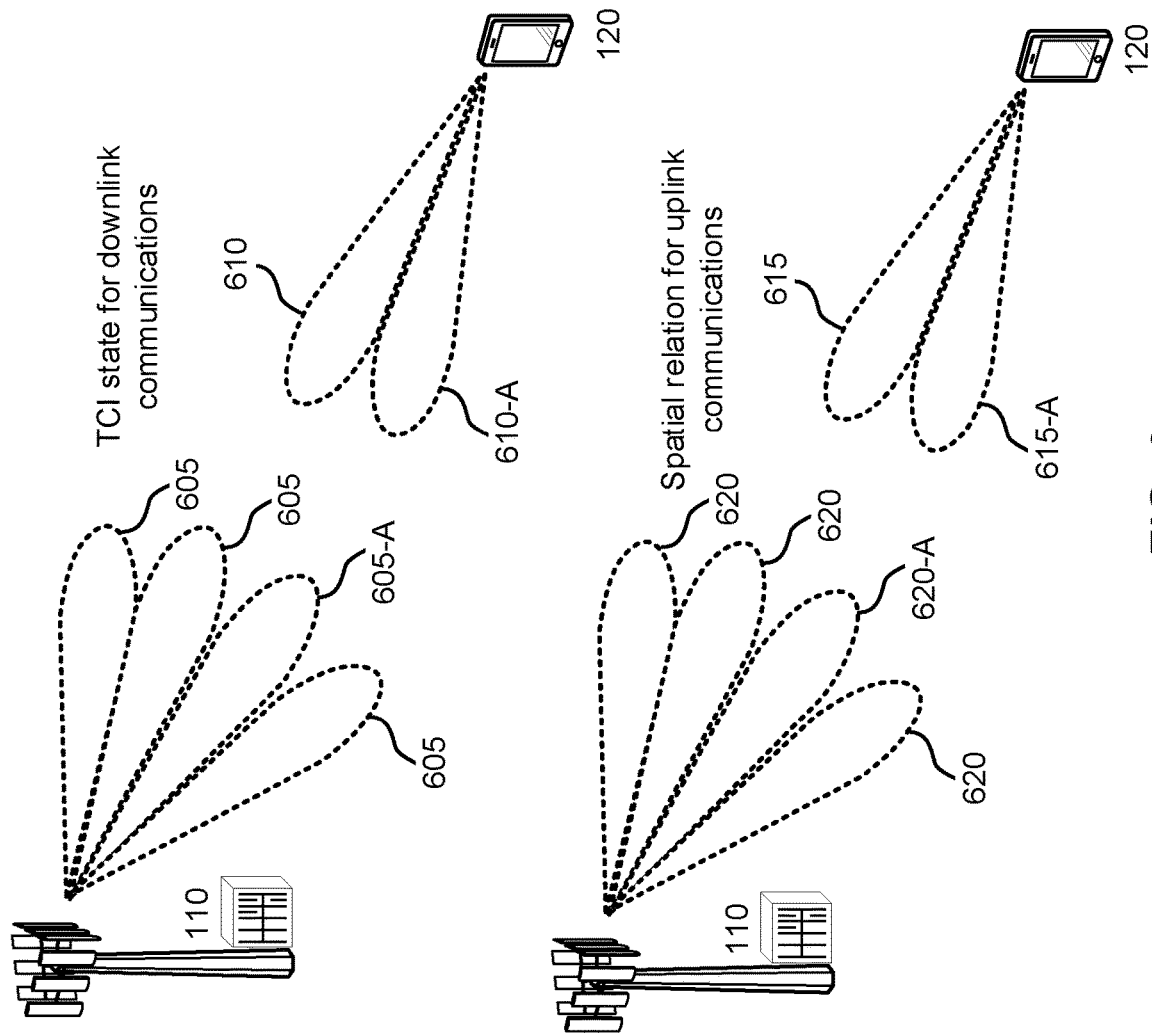
FIG. 6 is a diagram illustrating an example of using beams for communications between a base station and a UE, in accordance with the present disclosure.

FIG. 6 is a diagram illustrating an example 600 of using beams for communications between a base station and a UE, in accordance with the present disclosure. As shown in FIG. 6, example 600 includes communication between a base station 110 and a UE 120. In some aspects, the base station 110 and the UE 120 may be included in a wireless network such as wireless network 100. The base station 110 and the UE 120 may communicate on a wireless access link, which may include an uplink and a downlink.

The base station 110 may transmit to UEs 120 located within a coverage area of the base station 110. The base station 110 and the UE 120 (shown in FIG. 6) may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 605.

The UE 120 may attempt to receive downlink communications via one or more UE receive beams 610, which may be configured using different beamforming parameters at receive circuitry of the UE 120. The UE 120 may identify a particular BS transmit beam 605, shown as BS transmit beam 605-A, and a particular UE receive beam 610, shown as UE receive beam 610-A, that provide relatively favorable performance (for example, that have a best channel quality of the different measured combinations of BS transmit beams 605 and UE receive beams 610). In some aspects, the UE 120 may transmit an indication of which BS transmit beam 605 is identified by the UE 120 as a preferred BS transmit beam, which the base station 110 may select for downlink communications to the UE 120. The UE 120 may thus attain and maintain a beam pair link (BPL) with the base station 110 for downlink communications (for example, a combination of the BS transmit beam 605-A and the UE receive beam 610-A), which may be further refined and maintained in accordance with one or more established beam refinement procedures.

A downlink beam, such as a BS transmit beam 605 or a UE receive beam 610, may be associated with a transmission configuration indication (TCI) state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or a spatial receive parameter, among other examples. In some aspects, each BS transmit beam 605 may be associated with a synchronization signal block (SSB), and the UE 120 may indicate a preferred BS transmit beam 605 by transmitting uplink communications in resources of the SSB that are associated with the preferred BS transmit beam 605. A particular SSB may have an associated TCI state (for example, for an antenna port or for beamforming). The base station 110 may, in some examples, indicate a downlink BS transmit beam 605 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shifts, Doppler spreads, average delays, delay spreads, or spatial receive parameters, among other examples). In cases where the QCL type indicates spatial receive parameters, the QCL type may correspond to analog receive beamforming parameters of a UE receive beam 610 at the UE 120. Thus, the UE 120 may select a corresponding UE receive beam 610 from a set of BPLs based at least in part on the base station 110 indicating a BS transmit beam 605 via a TCI indication.

The base station 110 may maintain a set of activated TCI states for downlink shared channel communications and a set of activated TCI states for downlink control channel communications. The set of activated TCI states for downlink shared channel communications may correspond to beams that the base station 110 uses for downlink communications on a physical downlink shared channel (PDSCH). The set of activated TCI states for downlink control channel communications may correspond to beams that the base station 110 may use for downlink communications on a physical downlink control channel (PDCCH) or in a control resource set (CORESET). The UE 120 may also maintain a set of activated TCI states for receiving the downlink shared channel communications and the CORESET communications. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and/or activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the communication using a directional BS receive beam. Each UE transmit beam may have an associated beam ID, beam direction, or beam symbols, among other examples. The UE 120 may transmit uplink communications via one or more UE transmit beams 615.

The base station 110 may receive uplink communications via one or more BS receive beams 620. The base station 110 may identify a particular UE transmit beam 615, shown as UE transmit beam 615-A, and a particular BS receive beam 620, shown as BS receive beam 620-A, that provide relatively favorable performance (for example, that have a best channel quality of the different measured combinations of UE transmit beams 615 and BS receive beams 620). In some examples, the base station 110 may transmit an indication of which UE transmit beam 615 is identified by the base station 110 as a preferred UE transmit beam, which the base station 110 may select for communications from the UE 120. The UE 120 and the base station 110 may thus attain and maintain a BPL for uplink communications (for example, a combination of the UE transmit beam 615-A and the BS receive beam 620-A), which may be further refined and maintained in accordance with one or more established beam refinement procedures. An uplink beam, such as a UE transmit beam 615 or a BS receive beam 620, may be associated with a spatial relation. A spatial relation may indicate a directionality or a characteristic of the uplink beam, similar to one or more QCL properties, as described above.

As indicated above, FIG. 6 is provided as an example. Other examples may differ from what is described with respect to FIG. 6.

Figure 7:
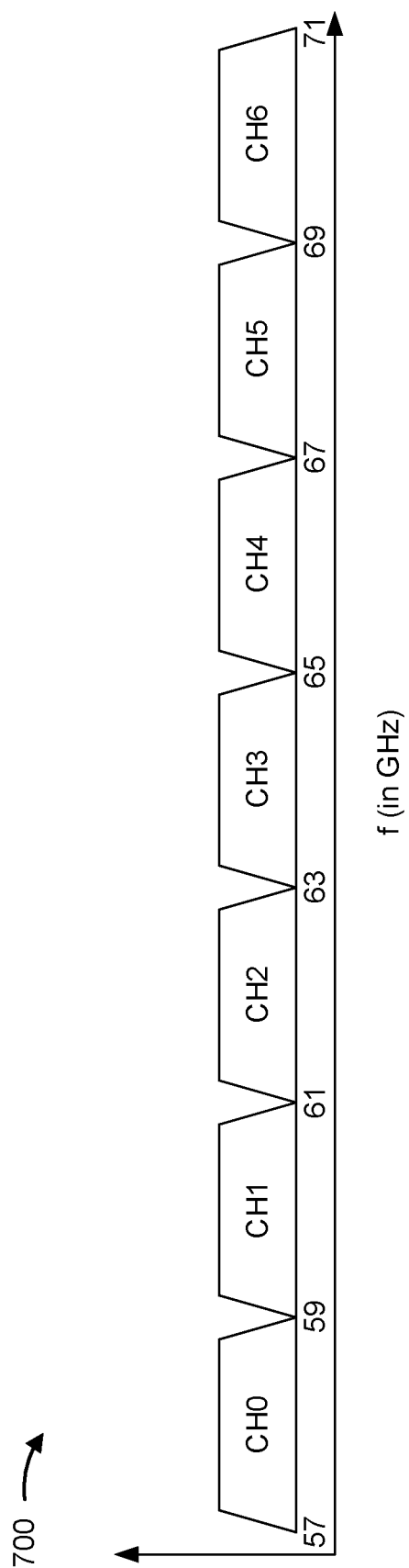
FIG. 7 is a diagram illustrating an example of frequency components in a frequency range, in accordance with the present disclosure.

FIG. 7 is a diagram illustrating an example 700 of frequency components in a frequency range, in accordance with the present disclosure. As shown in FIG. 7, a UE (e.g., the UE 120) may be in communication with a scheduling entity (e.g., the base station 110, and IAB node, and/or the like) in a wireless network (e.g., the wireless network 100) which may include an uplink and a downlink. The communication may be in a given frequency range with a set of frequency components (e.g., CH0, CH1, CH2, CH3, CH4, CH5, and/or CH6) divided in bands (e.g., 2.16 GHz bands). The frequency components may be component carriers, occupied bandwidths, bandwidth parts, channelizations, and/or the like.

Frequency bands for 5G NR may include frequency range 1 (FR1) and frequency range 2 (FR2), among others. FR1 may span from 410 MHz to 7.125 GHz, with various bands being allocated in the frequency range (e.g., n1, n2, n3, and so forth). FR2 may span from 24.25 GHz to 52.6 GHz, with various bands being allocated in the frequency range (e.g., n257, n258, n260, n2261, and/or the like). The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band.

Frequency bands for 5G NR continue to expand, including to frequency range (FR4). FR4 may span from 52.6 GHz to 114.25 GHz, with various bands being allocated in the frequency range. FR4 is often referred to as an "upper millimeter wave" or "sub THz." As shown in FIG. 7, the multiple frequency components (e.g., CH0, CH1, CH2, CH3, CH4, CH5, and/or CH6) may be in a portion of FR4 (e.g., from about 57 GHz to about 71 GHz).

To improve radio transmission performance, techniques such as quasi co-location (QCL) and/or beamforming may be used. QCL is a technique which characterizes the relationships between antennas and corresponding signaling beams. QCL may facilitate establishing beam characteristics for a channel based on characteristics of another channel.

Beamforming is a technique used to form directional, unicast beams between a UE and a base station so that performance of a radio link between the UE and the base station is improved. To perform beamforming, a base station may form a transmit beam directed to the UE, and the UE may form a receive beam to receive the transmit beam. Additionally, or alternatively, the UE may form a transmit beam directed to the base station, and the base station may form a receive beam to receive the transmit beam. The base station and/or the UE may use various hardware components to accomplish beamforming, such as controllers/processors, amplifiers, phase shifters, antenna elements, and/or the like. In some aspects, beamforming may use a beamforming codebook that includes one or more sets of beamforming weights which may be applied to an antenna array for a given frequency range. Beamforming is described in more detail above with respect to FIGS. 3, 5, and 6.

Beamforming continues to provide valuable improvement for radio transmission. However, when operating at ever increasing frequency ranges, such as FR4, beamforming performance loss for a given beamforming codebook, also known as "beam squinting," may occur. Beamforming performance loss may be caused by the limited hardware resources of the device (e.g., controllers/processors, amplifiers, phase shifters, antenna elements, and/or the like, as described above with respect to FIG. 3) attempting to achieve beamforming for increasingly separate frequency components at higher frequencies. This may be particularly problematic for carrier aggregation, sometimes called "channel bonding," in which two or more frequency components are combined to enhance data capacity. At higher frequencies, such as FR4, what may be an optimal beamforming configuration for one carrier aggregation may be suboptimal for another carrier aggregation.

Some techniques and apparatuses described herein may use a configuration between a scheduling entity and a UE to associate different sets of reference signals that are associated with channels to different subsets of frequency components for carrier aggregation. Associating different sets of reference signals to different subsets of frequency components may allow different beamforming weights to be used for the different subsets of frequency components and may allow the different reference signals to be quasi co-located with optimum physical channels, to minimize beamforming performance loss at higher frequencies, such as FR4. The reference signals may include channel state information reference signals (CSI-RSs), which may be used for reporting channel quality information (e.g., via a downlink), and/or sounding reference signals (SRSs), which may be used to obtain channel state information (e.g., via an uplink).

In some aspects, a scheduling entity, such as a base station, IAB node, and/or the like, may transmit the configuration to a UE, and the UE may receive the configuration from the scheduling entity, for associating different sets of reference signals to different subsets of frequency components for carrier aggregation. The scheduling entity may then transmit the reference signals, based at least in part on the configuration, to the UE, and the UE may monitor for the reference signals from the scheduling entity. In some aspects, the scheduling entity may optimize its beamforming codebook and the UE may adjust accordingly. As a result, by using a configuration to associate different sets of reference signals to different subsets of frequency components for carrier aggregation, thereby allowing optimum configurations for frequency components, beamforming performance loss at higher frequencies may be minimized.

As indicated above, FIG. 7 is provided as an example. Other examples may differ from what is described with respect to FIG. 7.

Figure 8:
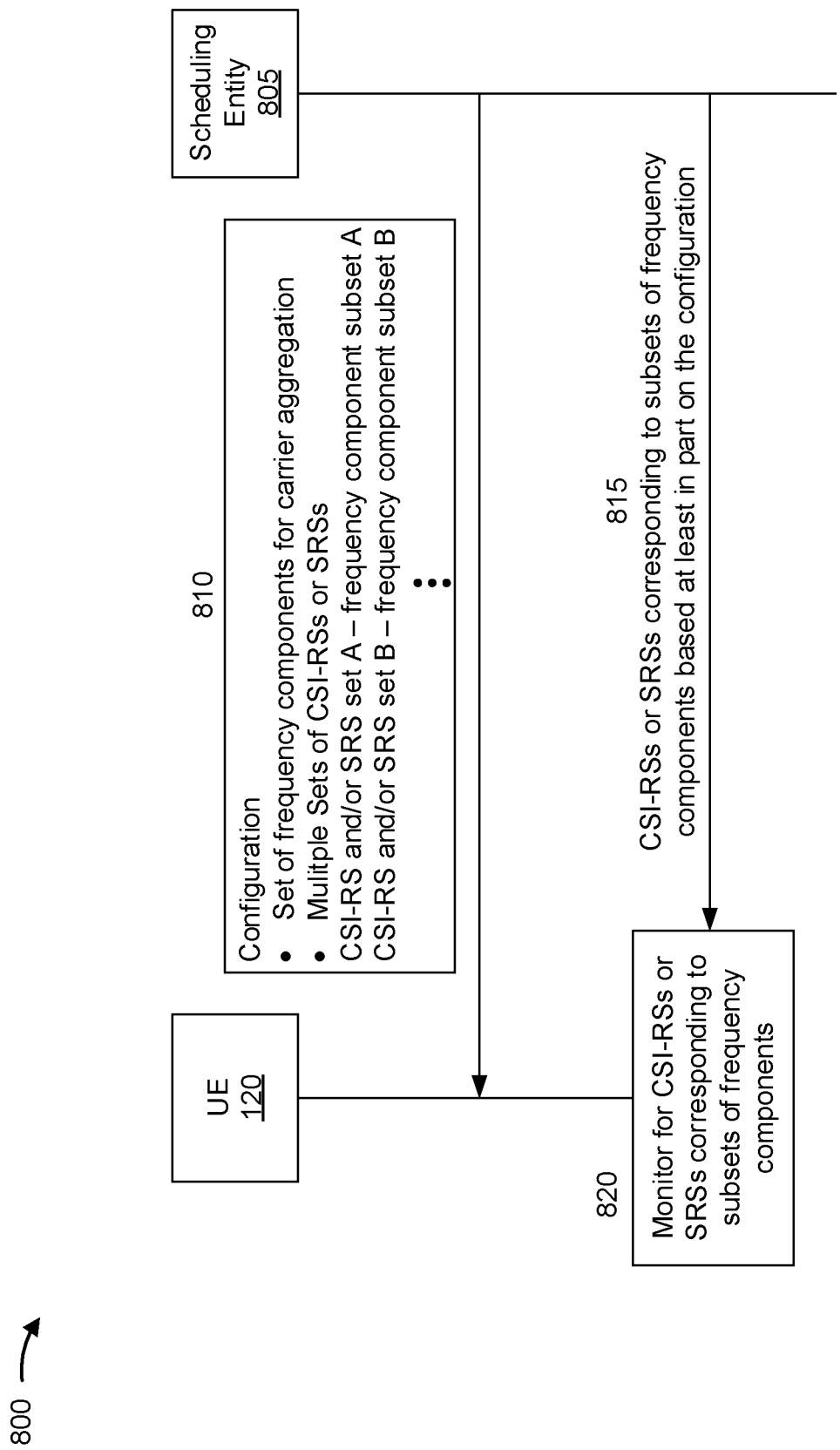
FIG. 8 is a diagram illustrating an example associated with reference signal configuration and quasi co-location (QCL) mappings for wide bandwidth systems, in accordance with the present disclosure.

FIG. 8 is a diagram illustrating an example 800 associated with reference signal configuration and QCL mappings for wide bandwidth systems, in accordance with the present disclosure. As shown in FIG. 8, the example 800 includes a UE 120 in communication with a scheduling entity 805 (e.g., the base station 110, an IAB node, and/or the like). The UE 120 and the scheduling entity 805 may be in communication with one another in a wireless network (e.g., the wireless network 100), which communication may include an uplink and a downlink.

As shown by reference number 810, to minimize beamforming performance loss at higher frequencies, the scheduling entity 805 may transmit a configuration to the UE 120 (e.g., via a downlink) that indicates a set of frequency components for carrier aggregation and that indicates multiple sets of reference signals. For example, the scheduling entity 805 may transmit a configuration to the UE 120 that indicates a set of frequency components for carrier aggregation, such as CH0, CH1, and/or the like, as described in connection with FIG. 7, and that indicates multiple sets of CSI-RSs (which may be used by the UE 120 for reporting channel quality information to the scheduling entity 805) and/or SRSs (which may be used by the scheduling entity 805 to obtain channel state information).

The configuration from the scheduling entity 805 may associate different sets of reference signals (e.g., CSI-RSs and/or SRSs) with different subsets of frequency components (e.g., CH0, CH1, and/or the like) included in the set of frequency components for the UE 120. As shown in FIG. 8, the scheduling entity 805 may associate a first set of reference signals (e.g., CSI-RS and/or SRS set A) with a first subset of frequency components (e.g., frequency component subset A, such as CH0 and CH1); a second set of the reference signals (e.g., CSI-RS and/or SRS set B) with a second subset of frequency components (e.g., frequency component subset B, such as CH2 and CH3); and/or the like. Associating different sets of reference signals with different subsets of frequency components may minimize beamforming performance loss at higher frequencies by allowing optimum configurations for frequency components.

In some aspects, associating different sets of reference signals (e.g., CSI-RSs and/or SRSs) with different subsets of frequency components (e.g., CH0, CH1, and/or the like) may allow different beamforming weights to be used for the different subsets of frequency components. For example, the first set of reference signals (e.g., CSI-RS and/or SRS set A) may be associated with a first set of beamforming weights; the second set of the reference signals (e.g., CSI-RS and/or SRS set B) may be associated with a second set of beamforming weights; and/or the like. In some aspects, each set of reference signals may have a corresponding, different set of beamforming weights. Allowing different beamforming weights to be used for different subsets of frequency components may allow the UE 120 to minimize beamforming performance loss at higher frequencies by allowing optimum beamforming weights for frequency components.

In some aspects, associating different sets of reference signals (e.g., CSI-RSs and/or SRSs) with different subsets of frequency components (e.g., CH0, CH1, and/or the like) may allow different reference signals to be quasi co-located with physical channels (e.g., physical downlink shared channels and/or physical uplink shared channels) on different subsets of frequency components, sometimes referred to as QCL mapping. For example, the first set of reference signals (e.g., CSI-RS and/or SRS set A) may be quasi co-located with a physical channel on the first subset of frequency components (e.g., frequency component subset A, such as CH0 and CH1); the second set of the reference signals (e.g., CSI-RS and/or SRS set B) may be quasi co-located with a physical channel on the second subset of frequency components (e.g., frequency component subset B, such as CH2 and CH3); and/or the like. Allowing different reference signals to be quasi co-located with physical channels on different subsets of frequency components may allow the UE 120 to minimize beamforming performance loss at higher frequencies by allowing optimum QCL mappings for frequency components.

The configuration from the scheduling entity 805 to the UE 120 may include an indication of resources for transmitting the sets of reference signals (e.g., CSI-RSs and/or SRSs) based at least in part on a variable bandwidth. The resources for transmitting the sets of reference signals may be defined by a starting resource block and an ending resource block and may be included in different sub-carriers of a single OFDM symbol that is measured. In some aspects, the indication of resources for transmitting the sets of reference signals may be "two-dimensional" (e.g., using time and frequency resources), where the sets of reference signals are transmitted in multiple sub-carriers across multiple OFDM symbols. In some aspects, the indication of resources for transmitting the sets of reference signals may be "three-dimensional" (e.g., using a combination of time, frequency, and beam resources), where the sets of reference signals are transmitted in multiple sub-carriers and multiple beams across multiple OFDM symbols. The configuration including an indication of resources for transmitting the sets of reference signals being based at least in part on a variable bandwidth (as opposed to a fixed bandwidth) may provide increased flexibility.

As shown by reference number 815, the scheduling entity 805 may transmit (e.g., via a downlink), and the UE 120 may receive, one or more reference signals, corresponding to a subset of frequency components included in the set of frequency components, based at least in part on the configuration. For example, the scheduling entity 805 may transmit, and the UE 120 may receive, one or more CSI-RSs and/or SRSs, corresponding to a subset of frequency components, such as CH0, CH1, and/or the like, based at least in part on the configuration. As described above, the scheduling entity 805 may transmit the one or more reference signals, corresponding to a subset of frequency components included in the set of frequency components, to the UE 120 to minimize beamforming performance loss at higher frequencies.

As shown by reference number 820, the UE 120 may monitor for one or more reference signals, corresponding to a subset of frequency components included in the set of frequency components, transmitted by the scheduling entity 805. For example, the UE 120 may monitor for one or more CSI-RSs or SRSs, transmitted by the scheduling entity 805, corresponding to a subset of frequency components, such as CH0, CH1, and/or the like, included in the set of frequency components, based at least in part on the configuration. As described above, the UE 120 may receive the one or more reference signals, corresponding to a subset of frequency components included in the set of frequency components, from the scheduling entity 805 to minimize beamforming performance loss at higher frequencies.

In some aspects, the UE 120 may measure one or more of the reference signals (e.g., CSI-RSs and/or SRSs) received from the scheduling entity 805 for improving beam performance (e.g., improved main lobes and/or reduced side lobes). For example, the UE 120 may measure one or more CSI-RSs and/or SRSs received from the scheduling entity 805 for performing a beam selection procedure, a beam management procedure, a beam refinement procedure, a beam failure detection procedure, a beam recovery procedure, and/or the like, for the subset of frequency components, based at least in part on measuring the one or more CSI-RSs or SRSs. As a result, the UE 120 may measure one or more of the reference signals received from the scheduling entity 805 to perform one or more beam procedures for improving beam performance.

As described above, the configuration from the scheduling entity 805 to the UE 120 may include an indication of resources for transmitting the sets of reference signals (e.g., CSI-RSs and/or SRSs) based at least in part on a variable bandwidth (as opposed to a fixed bandwidth). To support the variable bandwidth, when monitoring for the one or more reference signals, the UE 120 may measure frequency variations within a single OFDM symbol using a single radio frequency chain of the UE 120 (associated with a single set of beam weights). In some aspects, when monitoring for the one or more reference signals, the UE 120 may measure frequency variations of the multiple OFDM symbols using different radio frequency chains of the UE 120 (associated with different sets of beam weights) for different OFDM symbols. The UE 120 measuring frequency variations of one or more OFDM symbols using one or more radio frequency chains associated with beam weights may allow the UE 120 to support the variable bandwidth.

As indicated above, FIG. 8 is provided as an example. Other examples may differ from what is described with respect to FIG. 8.

Figure 9:
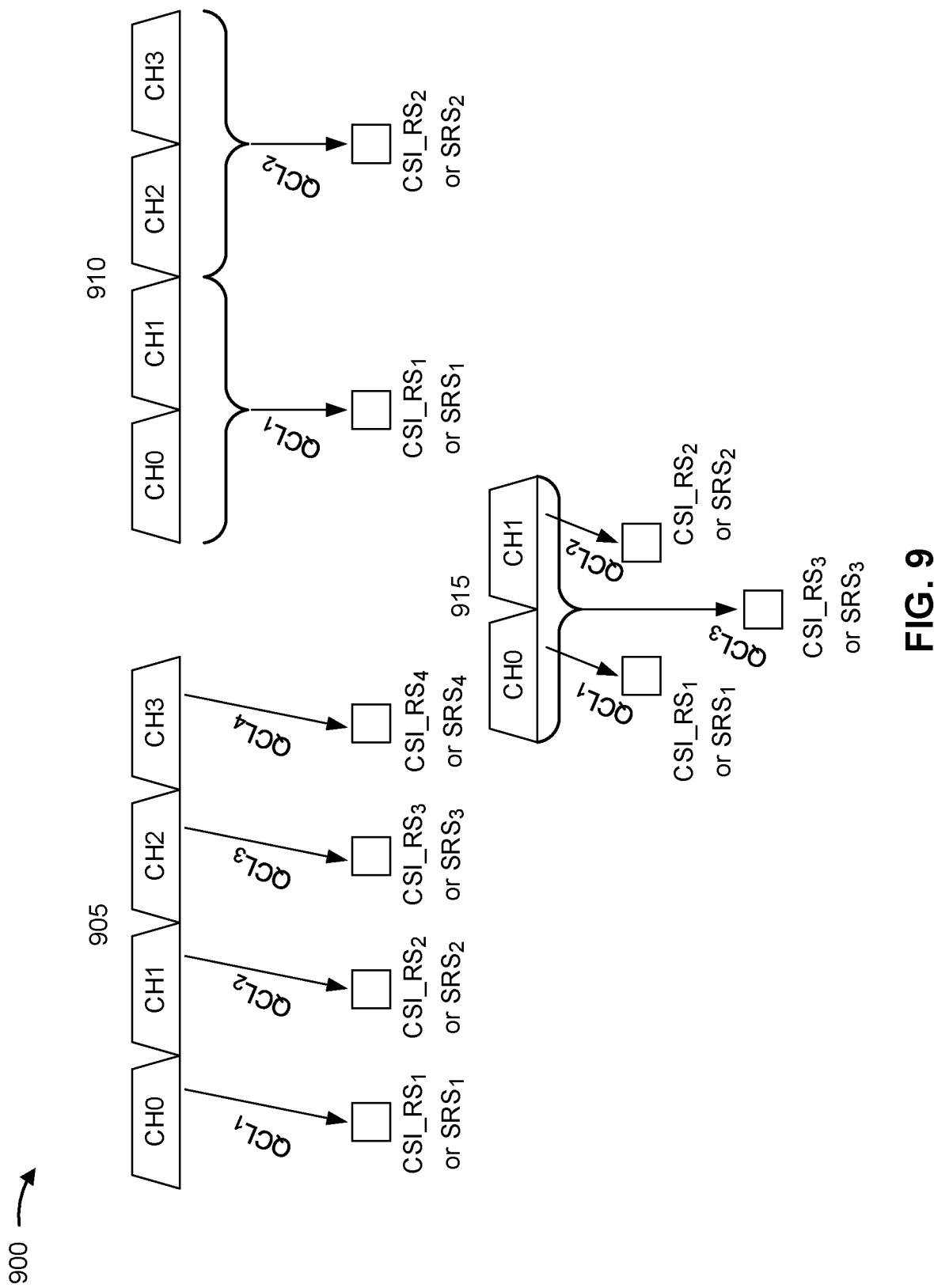
FIG. 9 is a diagram illustrating another example associated with reference signal configuration and QCL mappings for wide bandwidth systems, in accordance with the present disclosure.

FIG. 9 is a diagram illustrating another example 900 associated with reference signal configuration and QCL mappings for wide bandwidth systems, in accordance with the present disclosure. In the example 900, a UE (e.g., the UE 120) may be in communication with a scheduling entity (e.g., the scheduling entity 805, such as the base station 110, an IAB node, and/or the like) in a wireless network (e.g., the wireless network 100), which may include an uplink and a downlink. The communication may be in a given frequency range, such as a portion of FR4, having multiple frequency components (e.g., CH0, CH1, CH2, CH3, CH4, CH5, and/or CH6), as described in connection with FIG. 7.

As shown by reference number 905, in a first example, to minimize beamforming performance loss at higher frequencies, the scheduling entity 805 may transmit a configuration to the UE 120 (e.g., via a downlink) that indicates a set of frequency components for carrier aggregation and multiple sets of reference signals, and which associates the different sets of reference signals with the different subsets of the frequency components. For example, the scheduling entity 805 may transmit a configuration to the UE 120 that indicates a set of frequency components (e.g., CH0, CH1, CH2, and/or CH3) for carrier aggregation, that indicates multiple sets of reference signals (e.g., $CSI\text{-}RS_1$ or $SRS_1$, $CSI\text{-}RS_2$ or $SRS_2$, $CSI\text{-}RS_3$ or $SRS_3$, and/or $CSI\text{-}RS_4$ or $SRS_4$), and which associates the different sets of reference signals with different subsets of frequency components (e.g., $CSI\text{-}RS_1$ or $SRS_1$ associated with CH0, $CSI\text{-}RS_2$ or $SRS_2$ associated with CH1, $CSI\text{-}RS_3$ or $SRS_3$, associated with CH2, and/or $CSI\text{-}RS_4$ or $SRS_4$ associated with CH3). In this case, each subset of frequency components may include a single frequency component. As a result, each subset of frequency components may be associated with its own set of reference signals to minimize beamforming performance loss at higher frequencies.

In some aspects, the different sets of reference signals (e.g., $CSI\text{-}RS_1$ or $SRS_1$, $CSI\text{-}RS_2$ or $SRS_2$, $CSI\text{-}RS_3$ or $SRS_3$, and/or $CSI\text{-}RS_4$ or $SRS_4$) may be associated with different subsets of frequency components (e.g., CH0, CH1, CH2, and/or CH3) to allow different beamforming weights to be used for the different subsets of frequency components. For example, a first set of reference signals (e.g., $CSI\text{-}RS_1$ or $SRS_1$) may be associated with a first frequency component (e.g., CH0) to allow a first beamforming weight to be used; a second set of reference signals (e.g., $CSI\text{-}RS_2$ or $SRS_2$) may be associated with a second frequency component (e.g., CH1) to allow a second beamforming weight to be used; a third set of reference signals (e.g., $CSI\text{-}RS_3$ or $SRS_3$) may be associated with a third frequency component (e.g., CH2) to allow a third beamforming weight to be used; and/or a fourth set of reference signals (e.g., $CSI\text{-}RS_4$ or $SRS_4$) may be associated with a fourth frequency component (e.g., CH3) to allow a fourth beamforming weight to be used. Allowing different beamforming weights to be used for different subsets of frequency components may allow the UE 120 to minimize beamforming performance loss at higher frequencies.

In some aspects, the different sets of reference signals (e.g., $CSI\text{-}RS_1$ or $SRS_1$, $CSI\text{-}RS_2$ or $SRS_2$, $CSI\text{-}RS_3$ or $SRS_3$, and/or $CSI\text{-}RS_4$ or $SRS_4$) may be associated with different subsets of frequency components (e.g., CH0, CH1, CH2, and/or CH3) to allow different reference signals to be quasi co-located with physical channels on different subsets of frequency components. For example, the first set of reference signals (e.g., $CSI\text{-}RS_1$ or $SRS_1$) may be quasi co-located in a first mapping (e.g., $QCL_1$ mapping) with a physical channel on the first frequency component (e.g., CH0); the second set of reference signals (e.g., $CSI\text{-}RS_2$ or $SRS_2$) may be quasi co-located in a second mapping (e.g., $QCL_2$ mapping) with a physical channel on the second frequency component (e.g., CH1); the third set of reference signals (e.g., $CSI\text{-}RS_3$ or $SRS_3$) may be quasi co-located in a third mapping (e.g., $QCL_3$ mapping) with a physical channel on the third frequency component (e.g., CH2); and/or the fourth set of reference signals (e.g., $CSI\text{-}RS_4$ or $SRS_4$) may be quasi co-located in a fourth mapping (e.g., $QCL_4$ mapping) with a physical channel on the fourth frequency component (e.g., CH3). Allowing different reference signals to be quasi co-located with physical channels on different subsets of frequency components may allow the UE 120 to minimize beamforming performance loss at higher frequencies.

As shown by reference number 910, in a second example, to minimize beamforming performance loss at higher frequencies, the scheduling entity 805 may transmit a configuration to the UE 120 (e.g., via a downlink) that indicates a set of frequency components for carrier aggregation and multiple sets of reference signals, and which associates the different sets of reference signals with different subsets of multiple frequency components. For example, the scheduling entity 805 may transmit a configuration to the UE 120 that indicates a set of frequency components (e.g., CH0, CH1, CH2, and/or CH3) for carrier aggregation, that indicates multiple sets of reference signals (e.g., $CSI-RS_1$ or $SRS_1$ and/or $CSI-RS_2$ or $SRS_2$), and which associates the different sets of reference signals to different subsets of multiple frequency components (e.g., $CSI-RS_1$ or $SRS_1$ associated with CH0 and CH1, and $CSI-RS_2$ or $SRS_2$ associated with CH2 and CH3). As a result, subsets of multiple frequency components may be associated with their own set of reference signals to minimize beamforming performance loss at higher frequencies.

In some aspects, the different sets of reference signals (e.g., $CSI-RS_1$ or $SRS_1$, and/or $CSI-RS_2$ or $SRS_2$) may be associated with the different subsets of multiple frequency components (e.g., CH0 and CH1, and/or CH2 and CH3) to allow different beamforming weights to be used. For example, a first set of reference signals (e.g., $CSI-RS_1$ or $SRS_1$) may be associated with a first subset of multiple frequency components (e.g., CH0 and CH1) to allow a first beamforming weight to be used; and/or a second set of reference signals (e.g., $CSI-RS_2$ or $SRS_2$) may be associated with a second subset of multiple frequency components (e.g., CH2 and CH3) to allow a second beamforming weight to be used. Allowing different beamforming weights to be used for different subsets of multiple frequency components may allow the UE 120 to optimize beamforming weights to minimize beamforming performance loss at higher frequencies.

In some aspects, the different sets of reference signals (e.g., $CSI-RS_1$ or $SRS_1$, and/or $CSI-RS_2$ or $SRS_2$) may be associated with different subsets of multiple frequency components (e.g., CH0 and CH1, and/or CH2 and CH3) to allow different reference signals to be quasi co-located with physical channels. For example, the first set of reference signals (e.g., $CSI-RS_1$ or $SRS_1$) may be quasi co-located in a first mapping (e.g., $QCL_1$ mapping) with physical channels for a first subset of multiple frequency components (e.g., CH0 and CH1); and/or the second set of reference signals (e.g., $CSI-RS_2$ or $SRS_2$) may be quasi co-located in a second mapping (e.g., $QCL_2$ mapping) with physical channels for a second subset of multiple frequency components (e.g., CH2 and CH3). Allowing different reference signals to be quasi co-located with physical channels on different subsets of multiple frequency components may allow the UE 120 to minimize beamforming performance loss at higher frequencies.

As shown by reference number 915, in a third example, to minimize beamforming performance loss at higher frequencies, the scheduling entity 805 may transmit a configuration to the UE 120 (e.g., via a downlink) that indicates a set of frequency components for carrier aggregation and multiple sets of reference signals, and which associates the different sets of reference signals with different subsets of frequency components and to one or more groups of the different subsets of the frequency components. For example, the scheduling entity 805 may transmit a configuration to the UE 120 that indicates a set of frequency components (e.g., CH0 and/or CH1) for carrier aggregation, that indicates multiple sets of reference signals (e.g., $CSI-RS_1$ or $SRS_1$, $CSI-RS_2$ or $SRS_2$, and/or $CSI-RS_3$ or $SRS_3$), and which associates the different sets of reference signals to different subsets of the frequency components (e.g., $CSI-RS_1$ or $SRS_1$ associated with CH0, and $CSI-RS_2$ or $SRS_2$ associated with CH1) and to one or more groups of the different subsets of the frequency components (e.g., $CSI-RS_3$ or $SRS_3$ associated with CH0 and CH1 as a group). As a result, each subset of frequency components may be associated with its own set of reference signals, and/or one or more groups of subsets of frequency components may be associated with their own set of reference signals, to minimize beamforming performance loss at higher frequencies.

In some aspects, the different sets of reference signals (e.g., $CSI-RS_1$ or $SRS_1$, $CSI-RS_2$ or $SRS_2$, and/or $CSI-RS_3$ or $SRS_3$) may be associated with the different subsets of the frequency components (e.g., CH0 and CH1 as individual subsets) and to one or more groups of the different subsets of the frequency components (e.g., CH0 and CH1 as subsets in a group) to allow different beamforming weights to be used. For example, a first set of reference signals (e.g., $CSI-RS_1$ or $SRS_1$) may be associated with a first subset of frequency components (e.g., CH0) to allow a first beamforming weight to be used; a second set of reference signals (e.g., $CSI-RS_2$ or $SRS_2$) may be associated with a second subset of frequency components (e.g., CH1) to allow a second beamforming weight to be used; and/or a third set of reference signals (e.g., $CSI-RS_3$ or $SRS_3$) may be associated with a group of the first and second subsets of frequency components (e.g., CH0 and CH1) to allow a third beamforming weight to be used. Allowing different beamforming weights to be used for different subsets of frequency components and for different groups of subsets of frequency components may allow the UE 120 to optimize beamforming weights to minimize beamforming performance loss at higher frequencies.

In some aspects, the different sets of reference signals (e.g., $CSI-RS_1$ or $SRS_1$, $CSI-RS_2$ or $SRS_2$, and/or $CSI-RS_3$ or $SRS_3$) may be associated with the different subsets of the frequency components (e.g., CH0 and CH1 as individual subsets) and to one or more groups of the different subsets of the frequency components (e.g., CH0 and CH1 as subsets in a group) to allow different reference signals to be quasi co-located with physical channels on different subsets of frequency components and quasi co-located with physical channels on different groups of subsets of frequency components. For example, a first set of reference signals (e.g., $CSI-RS_1$ or $SRS_1$) may be quasi co-located in a first mapping (e.g., $QCL_1$ mapping) with a physical channel on a first subset of frequency components (e.g., CH0); a second set of reference signals (e.g., $CSI-RS_2$ or $SRS_2$) may be quasi co-located in a second mapping (e.g., $QCL_2$ mapping) with a physical channel on a second subset of frequency component (e.g., CH1); and/or a third set of reference signals (e.g., $CSI-RS_3$ or $SRS_3$) may be quasi co-located in a third mapping (e.g., $QCL_3$ mapping) with physical channels on a group of the first and second subsets of frequency components (e.g., CH0 and CH1). Allowing different reference signals to be quasi co-located with physical channels on different subsets of frequency components and for different groups of subsets of frequency components may allow the UE 120 to optimize QCL mapping to minimize beamforming performance loss at higher frequencies.

As indicated above, FIG. 9 is provided as an example. Other examples may differ from what is described with respect to FIG. 9.

Figure 10:
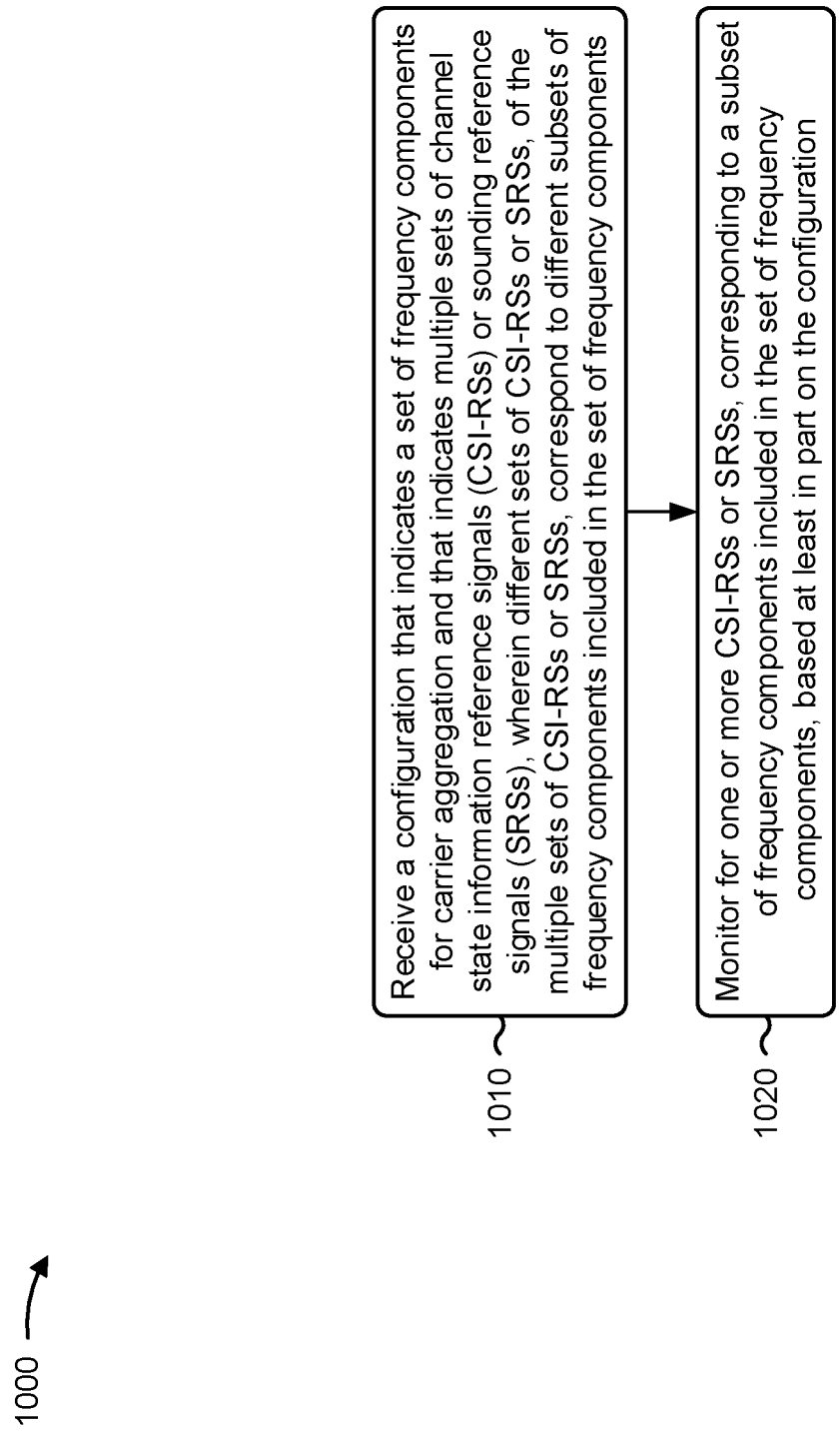
FIGS. 10-11 are diagrams illustrating example processes associated with reference signal configuration and QCL mappings for wide bandwidth systems, in accordance with the present disclosure.

FIG. 10 is a diagram illustrating an example process 1000 performed, for example, by a UE, in accordance with the present disclosure. Example process 1000 is an example where the UE (e.g., the UE 120) performs operations associated with reference signal configuration and QCL mappings for wide bandwidth systems.

As shown in FIG. 10, in some aspects, process 1000 may include receiving a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components (block 1010). For example, the UE (e.g., using antenna 252, demodulator 254, MIMO detector 256, receive processor 258, controller/processor 280, and/or memory 282) may receive a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components, as described above.

As further shown in FIG. 10, in some aspects, process 1000 may include monitoring for one or more CSI-RSs or SRSs, corresponding to a subset of frequency components included in the set of frequency components, based at least in part on the configuration (block 1020). For example, the UE (e.g., using antenna 252, demodulator 254, MIMO detector 256, receive processor 258, controller/processor 280, and/or memory 282) may monitor for one or more CSI-RSs or SRSs, corresponding to a subset of frequency components included in the set of frequency components, based at least in part on the configuration, as described above.

Process 1000 may include additional aspects, such as any single aspect or any combination of aspects described below and/or in connection with one or more other processes described elsewhere herein.

In a first aspect, a first set of CSI-RSs or SRSs, of the multiple sets of CSI-RSs or SRSs, is associated with a first set of beamforming weights, and wherein a second set of CSI-RSs or SRSs, of the multiple sets of CSI-RSs or SRSs, is associated with a second set of beamforming weights.

In a second aspect, alone or in combination with the first aspect, a first set of CSI-RSs or SRSs, of the multiple sets of CSI-RSs or SRSs, is quasi co-located with a physical channel on a first subset of frequency components, and wherein a second set of CSI-RSs or SRSs, of the multiple sets of CSI-RSs or SRSs, is quasi co-located with a physical channel on a second subset of frequency components.

In a third aspect, alone or in combination with one or more of the first and second aspects, a QCL mapping between a first set of CSI-RSs or SRSs, of the multiple sets of CSI-RSs or SRSs, and a first subset of frequency components is different from a QCL mapping between a second set of CSI-RSs or SRSs, of the multiple sets of CSI-RSs or SRSs, and a second subset of frequency components.

In a fourth aspect, alone or in combination with one or more of the first through third aspects, the first subset of frequency components is a single frequency component, and the second subset of frequency components includes the single frequency component and at least one other frequency component.

In a fifth aspect, alone or in combination with one or more of the first through fourth aspects, the subset of frequency components is a single frequency component.

In a sixth aspect, alone or in combination with one or more of the first through fourth aspects, the subset of frequency components includes two or more frequency components.

In a seventh aspect, alone or in combination with one or more of the first through sixth aspects, process 1000 includes performing at least one of a beam selection procedure, a beam management procedure, a beam refinement procedure, a beam failure detection procedure, or a beam recovery procedure for the subset of frequency components based at least in part on measuring the one or more CSI-RSs or SRSs.

In an eighth aspect, alone or in combination with one or more of the first through seventh aspects, one or more CSI-RS or SRS resources, used for transmission of the one or more CSI-RSs or SRSs, is based at least in part on a variable bandwidth used for communications of the UE.

In a ninth aspect, alone or in combination with one or more of the first through eighth aspects, one or more CSI-RS or SRS resources, used for transmission of the one or more CSI-RSs or SRSs, are defined by a starting resource block and an ending resource block.

In a tenth aspect, alone or in combination with one or more of the first through ninth aspects, process 1000 includes receiving an indication of a set of CSI-RS or SRS resources that are included in different sub-carriers of a single OFDM symbol, and wherein monitoring for the one or more CSI-RSs or SRSs comprises measuring frequency variations within the single OFDM symbol using a single radio frequency chain of the UE.

In an eleventh aspect, alone or in combination with one or more of the first through ninth aspects, process 1000 includes receiving an indication of a set of CSI-RS or SRS resources that are to be transmitted in multiple sub-carriers across multiple OFDM symbols, and wherein monitoring for the one or more CSI-RSs or SRSs comprises measuring frequency variations within each OFDM symbol, of the multiple OFDM symbols, using different radio frequency chains of the UE for different OFDM symbols.

In a twelfth aspect, alone or in combination with one or more of the first through ninth aspects, process 1000 includes receiving an indication of a set of CSI-RS or SRS resources that are to be transmitted in multiple sub-carriers and multiple beams across multiple OFDM symbols, and wherein monitoring for the one or more CSI-RSs or SRSs comprises measuring frequency variations within each OFDM symbol, of the multiple OFDM symbols, using different radio frequency chains of the UE for different OFDM symbols.

In a thirteenth aspect, alone or in combination with one or more of the first through twelfth aspects, the set of frequency components is a set of component carriers, a set of occupied bandwidths, a set of bandwidth parts, or a set of channelizations.

In a fourteenth aspect, alone or in combination with one or more of the first through thirteenth aspects, the set of frequency components are included in a frequency range included in at least one of a frequency range 2 band or a frequency range 4 band.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
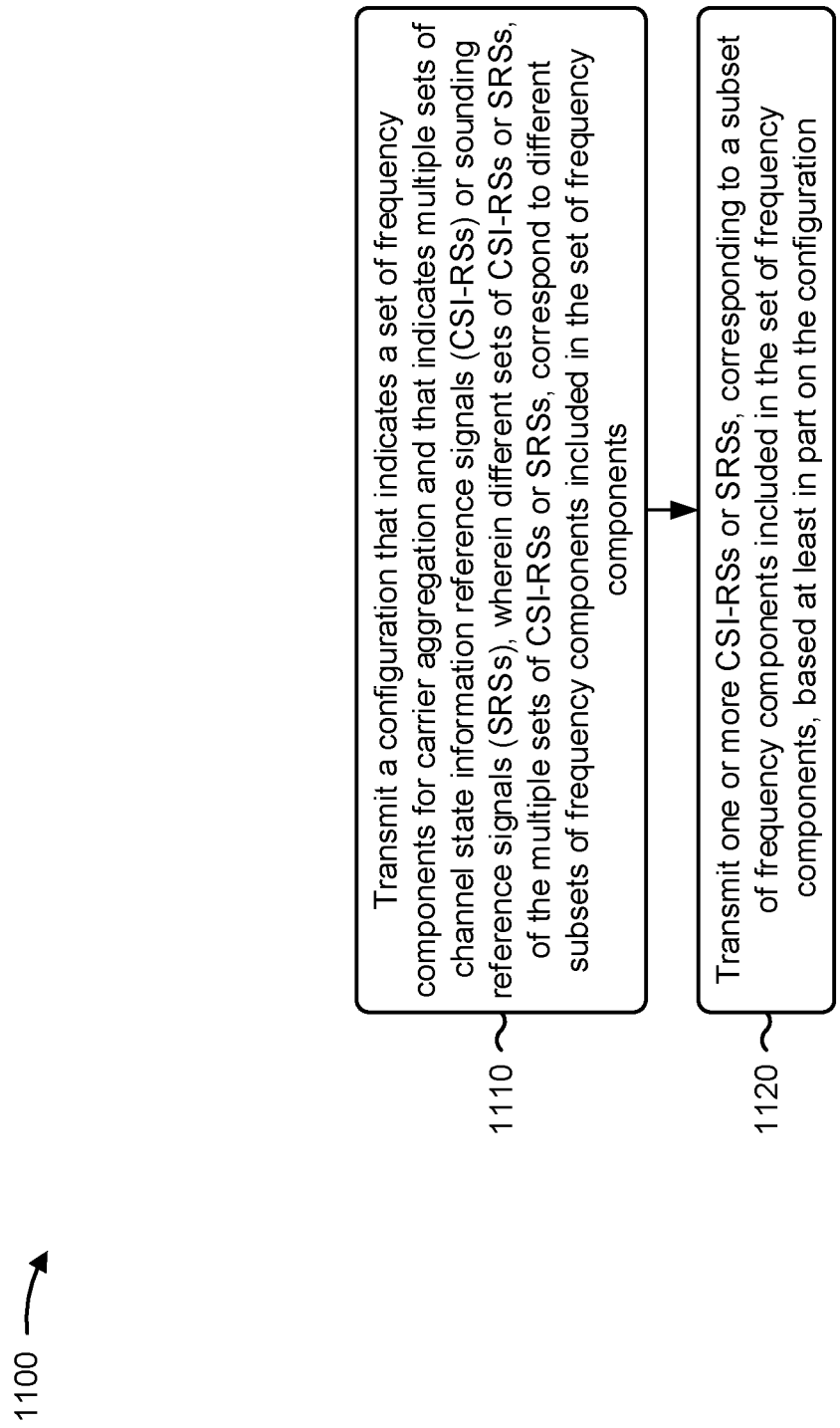

FIG. 11 is a diagram illustrating an example process 1100 performed, for example, by a scheduling entity, in accordance with the present disclosure. Example process 1100 is an example where the scheduling entity (e.g., the scheduling entity 805, such as the base station 110, an IAB node, and/or the like) performs operations associated with reference signal configuration and QCL mappings for wide bandwidth systems.

As shown in FIG. 11, in some aspects, process 1100 may include transmitting a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components (block 1110). For example, the scheduling entity (e.g., using transmit processor 220, TX MIMO processor 230, modulator 232, antenna 234, controller/processor 240, memory 242, and/or scheduler 246) may transmit a configuration that indicates a set of frequency components for carrier aggregation and that indicates multiple sets of CSI-RSs or SRSs, wherein different sets of CSI-RSs or SRSs, of the multiple sets of CSI-RSs or SRSs, correspond to different subsets of frequency components included in the set of frequency components, as described above.

As further shown in FIG. 11, in some aspects, process 1100 may include transmitting one or more CSI-RSs or SRSs, corresponding to a subset of frequency components included in the set of frequency components, based at least in part on the configuration (block 1120). For example, the scheduling entity (e.g., using transmit processor 220, TX MIMO processor 230, modulator 232, antenna 234, controller/processor 240, memory 242, and/or scheduler 246) may transmit one or more CSI-RSs or SRSs, corresponding to a subset of frequency components included in the set of frequency components, based at least in part on the configuration, as described above.

Process 1100 may include additional aspects, such as any single aspect or any combination of aspects described below and/or in connection with one or more other processes described elsewhere herein.

In a first aspect, a first set of CSI-RSs or SRSs, of the multiple sets of CSI-RSs or SRSs, is associated with a first set of beamforming weights, and wherein a second set of CSI-RSs or SRSs, of the multiple sets of CSI-RSs or SRSs, is associated with a second set of beamforming weights.

In a second aspect, alone or in combination with the first aspect, a first set of CSI-RSs or SRSs, of the multiple sets of CSI-RSs or SRSs, is quasi co-located with a physical channel on a first subset of frequency components, and wherein a second set of CSI-RSs or SRSs, of the multiple sets of CSI-RSs or SRSs, is quasi co-located with a physical channel on a second subset of frequency components.

In a third aspect, alone or in combination with one or more of the first and second aspects, a QCL mapping between a first set of CSI-RSs or SRSs, of the multiple sets of CSI-RSs or SRSs, and a first subset of frequency components is different from a QCL mapping between a second set of CSI-RSs or SRSs, of the multiple sets of CSI-RSs or SRSs, and a second subset of frequency components.

In a fourth aspect, alone or in combination with one or more of the first through third aspects, the first subset of frequency components is a single frequency component, and the second subset of frequency components includes the single frequency component and at least one other frequency component.

In a fifth aspect, alone or in combination with one or more of the first through fourth aspects, the subset of frequency components is a single frequency component.

In a sixth aspect, alone or in combination with one or more of the first through fourth aspects, the subset of frequency components includes two or more frequency components.

In a seventh aspect, alone or in combination with one or more of the first through sixth aspects, process 1100 includes performing at least one of a beam selection procedure, a beam management procedure, a beam refinement procedure, a beam failure detection procedure, or a beam recovery procedure for the subset of frequency components based at least in part on measuring the one or more CSI-RSs or SRSs.

In an eighth aspect, alone or in combination with one or more of the first through seventh aspects, one or more CSI-RS or SRS resources, used for transmission of the one or more CSI-RSs or SRSs, is based at least in part on a variable bandwidth used for communications of the UE.

In a ninth aspect, alone or in combination with one or more of the first through eighth aspects, one or more CSI-RS or SRS resources, used for transmission of the one or more CSI-RSs or SRSs, are defined by a starting resource block and an ending resource block.

In a tenth aspect, alone or in combination with one or more of the first through ninth aspects, process 1100 includes transmitting an indication of a set of CSI-RS or SRS resources that are included in different sub-carriers of a single OFDM symbol, and wherein transmitting the one or more CSI-RSs or SRSs comprises transmitting the one or more CSI-RSs or SRSs to enable a measurement of frequency variations within the single OFDM symbol using a single radio frequency chain of the UE.

In an eleventh aspect, alone or in combination with one or more of the first through ninth aspects, process 1100 includes transmitting an indication of a set of CSI-RS or SRS resources in multiple sub-carriers across multiple OFDM symbols, and wherein transmitting the one or more CSI-RSs or SRSs comprises transmitting the one or more CSI-RSs or SRSs to enable a measurement of frequency variations within each OFDM symbol, of the multiple OFDM symbols, using different radio frequency chains of the UE for different OFDM symbols.

In a twelfth aspect, alone or in combination with one or more of the first through ninth aspects, process 1100 includes transmitting an indication of a set of CSI-RS or SRS resources in multiple sub-carriers and multiple beams across multiple OFDM symbols, and wherein transmitting the one or more CSI-RSs or SRSs comprises transmitting the one or more CSI-RSs or SRSs to enable a measurement of frequency variations within each OFDM symbol, of the multiple OFDM symbols, using different radio frequency chains of the UE for different OFDM symbols.

In a thirteenth aspect, alone or in combination with one or more of the first through twelfth aspects, the set of frequency components is a set of component carriers, a set of occupied bandwidths, a set of bandwidth parts, or a set of channelizations.

In a fourteenth aspect, alone or in combination with one or more of the first through thirteenth aspects, the set of frequency components are included in a frequency range included in at least one of a frequency range 2 band or a frequency range 4 band.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: receiving a configuration that indicates a set of frequency components for carrier aggregation and that indicates multiple sets of channel state information reference signals (CSI-RSs) or sounding reference signals (SRSs), wherein different sets of CSI-RSs or SRSs, of the multiple sets of CSI-RSs or SRSs, correspond to different subsets of frequency components included in the set of frequency components; and monitoring for one or more CSI-RSs or SRSs, corresponding to a subset of frequency components included in the set of frequency components, based at least in part on the configuration.

Aspect 2: The method of Aspect 1, wherein a first set of CSI-RSs or SRSs, of the multiple sets of CSI-RSs or SRSs, is associated with a first set of beamforming weights, and wherein a second set of CSI-RSs or SRSs, of the multiple sets of CSI-RSs or SRSs, is associated with a second set of beamforming weights.

Aspect 3: The method of either of Aspects 1 or 2, wherein a first set of CSI-RSs or SRSs, of the multiple sets of CSI-RSs or SRSs, is quasi co-located with a physical channel on a first subset of frequency components, and wherein a second set of CSI-RSs or SRSs, of the multiple sets of CSI-RSs or SRSs, is quasi co-located with a physical channel on a second subset of frequency components.

Aspect 4: The method of any of Aspects 1-3, wherein a quasi co-location (QCL) mapping between a first set of CSI-RSs or SRSs, of the multiple sets of CSI-RSs or SRSs, and a first subset of frequency components is different from a QCL mapping between a second set of CSI-RSs or SRSs, of the multiple sets of CSI-RSs or SRSs, and a second subset of frequency components.

Aspect 5: The method of Aspect 4, wherein the first subset of frequency components is a single frequency component, and the second subset of frequency components includes the single frequency component and at least one other frequency component.

Aspect 6: The method of any of Aspects 1-5, wherein the subset of frequency components is a single frequency component.

Aspect 7: The method of any of Aspects 1-5, wherein the subset of frequency components includes two or more frequency components.

Aspect 8: The method of any of Aspects 1-7, further comprising performing at least one of a beam selection procedure, a beam management procedure, a beam refinement procedure, a beam failure detection procedure, or a beam recovery procedure for the subset of frequency components based at least in part on measuring the one or more CSI-RSs or SRSs.

Aspect 9: The method of any of Aspects 1-8, wherein one or more CSI-RS or SRS resources, used for transmission of the one or more CSI-RSs or SRSs, is based at least in part on a variable bandwidth used for communications of the UE.

Aspect 10: The method of any of Aspects 1-9, wherein one or more CSI-RS or SRS resources, used for transmission of the one or more CSI-RSs or SRSs, are defined by a starting resource block and an ending resource block.

Aspect 11: The method of any of Aspects 1-10, further comprising: receiving an indication of a set of CSI-RS or SRS resources that are included in different sub-carriers of a single orthogonal frequency division multiplexing (OFDM) symbol; and wherein monitoring for the one or more CSI-RSs or SRSs comprises measuring frequency variations within the single OFDM symbol using a single radio frequency chain of the UE.

Aspect 12: The method of any of Aspects 1-10, further comprising: receiving an indication of a set of CSI-RS or SRS resources that are to be transmitted in multiple sub-carriers across multiple orthogonal frequency division multiplexing (OFDM) symbols; and wherein monitoring for the one or more CSI-RSs or SRSs comprises measuring frequency variations within each OFDM symbol, of the multiple OFDM symbols, using different radio frequency chains of the UE for different OFDM symbols.

Aspect 13: The method of any of Aspects 1-10, further comprising: receiving an indication of a set of CSI-RS or SRS resources that are to be transmitted in multiple sub-carriers and multiple beams across multiple orthogonal frequency division multiplexing (OFDM) symbols; and wherein monitoring for the one or more CSI-RSs or SRSs comprises measuring frequency variations within each OFDM symbol, of the multiple OFDM symbols, using different radio frequency chains of the UE for different OFDM symbols.

Aspect 14: The method of any of Aspects 1-13, wherein the set of frequency components is a set of component carriers, a set of occupied bandwidths, a set of bandwidth parts, or a set of channelizations.

Aspect 15: The method of any of Aspects 1-14, wherein the set of frequency components are included in a frequency range included in at least one of a frequency range 2 band or a frequency range 4 band.

Aspect 16: A method of wireless communication performed by a scheduling entity, comprising: transmitting a configuration that indicates a set of frequency components for carrier aggregation and that indicates multiple sets of channel state information reference signals (CSI-RSs) or sounding reference signals (SRSs), wherein different sets of CSI-RSs or SRSs, of the multiple sets of CSI-RSs or SRSs, correspond to different subsets of frequency components included in the set of frequency components; and transmitting one or more CSI-RSs or SRSs, corresponding to a subset of frequency components included in the set of frequency components, based at least in part on the configuration.

Aspect 17: The method of Aspect 16, wherein a first set of CSI-RSs or SRSs, of the multiple sets of CSI-RSs or SRSs, is associated with a first set of beamforming weights, and wherein a second set of CSI-RSs or SRSs, of the multiple sets of CSI-RSs or SRSs, is associated with a second set of beamforming weights.

Aspect 18: The method of either of Aspects 16 or 17, wherein a first set of CSI-RSs or SRSs, of the multiple sets of CSI-RSs or SRSs, is quasi co-located with a physical channel on a first subset of frequency components, and wherein a second set of CSI-RSs or SRSs, of the multiple sets of CSI-RSs or SRSs, is quasi co-located with a physical channel on a second subset of frequency components.

Aspect 19: The method of any of Aspects 16-18, wherein a quasi co-location (QCL) mapping between a first set of CSI-RSs or SRSs, of the multiple sets of CSI-RSs or SRSs, and a first subset of frequency components is different from a QCL mapping between a second set of CSI-RSs or SRSs, of the multiple sets of CSI-RSs or SRSs, and a second subset of frequency components.

Aspect 20: The method of Aspect 19, wherein the first subset of frequency components is a single frequency component, and the second subset of frequency components includes the single frequency component and at least one other frequency component.

Aspect 21: The method of any of Aspects 16-20, wherein the subset of frequency components is a single frequency component.

Aspect 22: The method of any of Aspects 16-20, wherein the subset of frequency components includes two or more frequency components.

Aspect 23: The method of any of Aspects 16-22, further comprising performing at least one of a beam selection procedure, a beam management procedure, a beam refinement procedure, a beam failure detection procedure, or a beam recovery procedure for the subset of frequency components based at least in part on measuring the one or more CSI-RSs or SRSs.

Aspect 24: The method of any of Aspects 16-23, wherein one or more CSI-RS or SRS resources, used for transmission of the one or more CSI-RSs or SRSs, is based at least in part on a variable bandwidth used for communications of the UE.

Aspect 25: The method of any of Aspects 16-24, wherein one or more CSI-RS or SRS resources, used for transmission of the one or more CSI-RSs or SRSs, are defined by a starting resource block and an ending resource block.

Aspect 26: The method of any of Aspects 16-25, further comprising: transmitting an indication of a set of CSI-RS or SRS resources that are included in different sub-carriers of a single orthogonal frequency division multiplexing (OFDM) symbol; and wherein transmitting the one or more CSI-RSs or SRSs comprises transmitting the one or more CSI-RSs or SRSs to enable a measurement of frequency variations within the single OFDM symbol using a single radio frequency chain of the UE.

Aspect 27: The method of any of Aspects 16-25, further comprising: transmitting an indication of a set of CSI-RS or SRS resources in multiple sub-carriers across multiple orthogonal frequency division multiplexing (OFDM) symbols; and wherein transmitting the one or more CSI-RSs or SRSs comprises transmitting the one or more CSI-RSs or SRSs to enable a measurement of frequency variations within each OFDM symbol, of the multiple OFDM symbols, using different radio frequency chains of the UE for different OFDM symbols.

Aspect 28: The method of any of Aspects 16-25, further comprising: transmitting an indication of a set of CSI-RS or SRS resources in multiple sub-carriers and multiple beams across multiple orthogonal frequency division multiplexing (OFDM) symbols; and wherein transmitting the one or more CSI-RSs or SRSs comprises transmitting the one or more CSI-RSs or SRSs to enable a measurement of frequency variations within each OFDM symbol, of the multiple OFDM symbols, using different radio frequency chains of the UE for different OFDM symbols.

Aspect 29: The method of any of Aspects 16-28, wherein the set of frequency components is a set of component carriers, a set of occupied bandwidths, a set of bandwidth parts, or a set of channelizations.

Aspect 30: The method of any of Aspects 16-29, wherein the set of frequency components are included in a frequency range included in at least one of a frequency range 2 band or a frequency range 4 band.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive a configuration that indicates a set of frequency components corresponding to a plurality of quasi co-location (QCL) mappings, the configuration indicating multiple sets of reference signals,
         wherein the configuration associates each set of reference signals, of the multiple sets of reference signals, to different subsets of frequency components included in the set of frequency components, and
         wherein the plurality of QCL mappings includes:
            a first QCL mapping between a first set of reference signals, of the multiple sets of reference signals, and a first subset of frequency components, of the set of frequency components,
            a second QCL mapping between a second set of reference signals, of the multiple sets of reference signals, and a second subset of frequency components, of the set of frequency components, and
            a third QCL mapping between a third set of reference signals, of the multiple sets of reference signals, and at least one of the first subset of frequency components or the second subset of frequency components; and
      monitor for one or more reference signals, corresponding to the set of frequency components, based at least in part on the configuration.

2. The apparatus of claim 1, wherein the first set of reference signals is associated with a first set of beamforming weights, and wherein the second set of reference signals is associated with a second set of beamforming weights.

3. The apparatus of claim 1, wherein the first set of reference signals is quasi co-located with a physical channel on the first subset of frequency components, and wherein the second set of reference signals is quasi co-located with a physical channel on the second subset of frequency components.

4. The apparatus of claim 1, wherein the first subset of frequency components is a single frequency component, and the second subset of frequency components includes the single frequency component and at least one other frequency component.

5. The apparatus of claim 1, wherein the first subset of frequency components or the second subset of frequency components is a single frequency component.

6. The apparatus of claim 1, wherein the first subset of frequency components or the second subset of frequency components includes two or more frequency components.

7. The apparatus of claim 1, wherein the one or more processors are further configured to perform at least one of a beam selection procedure, a beam management procedure, a beam refinement procedure, a beam failure detection procedure, or a beam recovery procedure for the first subset of frequency components or the second subset of frequency components based at least in part on measuring the one or more reference signals.

8. The apparatus of claim 1, wherein one or more reference signal resources, used for transmission of the one or more reference signals, are based at least in part on a variable bandwidth used for communications of the UE.

9. The apparatus of claim 1, wherein one or more reference signal resources, used for transmission of the one or more reference signals, are defined by a starting resource block and an ending resource block.

10. The apparatus of claim 1, wherein the one or more processors are further configured to:
   receive an indication of a set of reference signal resources that are included in different sub-carriers of a single orthogonal frequency division multiplexing (OFDM) symbol; and
   wherein the one or more processors, to monitor for the one or more reference signals, are configured to measure frequency variations within the single OFDM symbol using a single radio frequency chain of the UE.

11. The apparatus of claim 1, wherein the one or more processors are further configured to:
   receive an indication of a set of reference signal resources that are to be transmitted in multiple sub-carriers across multiple orthogonal frequency division multiplexing (OFDM) symbols; and
   wherein the one or more processors, to monitor for the one or more reference signals, are configured to measure frequency variations within each OFDM symbol, of the multiple OFDM symbols, using different radio frequency chains of the UE for different OFDM symbols.

12. The apparatus of claim 1, wherein the one or more processors are further configured to:

receive an indication of a set of reference signal resources that are to be transmitted in multiple sub-carriers and multiple beams across multiple orthogonal frequency division multiplexing (OFDM) symbols; and wherein the one or more processors, to monitor for the one or more reference signals, are configured to measure frequency variations within each OFDM symbol, of the multiple OFDM symbols, using different radio frequency chains of the UE for different OFDM symbols.

13. The apparatus of claim 1, wherein the set of frequency components is a set of component carriers, a set of occupied bandwidths, a set of bandwidth parts, or a set of channelizations.

14. The apparatus of claim 1, wherein the set of frequency components are included in a frequency range included in at least one of a frequency range 2 band or a frequency range 4 band.

15. An apparatus for wireless communication at a scheduling entity, comprising:
one or more memories; and
one or more processors, coupled to the one or more memories, configured to:
transmit a configuration that indicates a set of frequency components corresponding to a plurality of quasi co-location (QCL) mappings, the configuration indicating multiple sets of reference signals,
wherein the configuration associates each set of reference signals, of the multiple sets of reference signals, to different subsets of frequency components included in the set of frequency components, and
wherein the plurality of QCL mappings includes:
a first QCL mapping between a first set of reference signals, of the multiple sets of reference signals, and a first subset of frequency components, of the set of frequency components,
a second QCL mapping between a second set of reference signals, of the multiple sets of reference signals, and a second subset of frequency components, of the set of frequency components, and
a third QCL mapping between a third set of reference signals, of the multiple sets of reference signals, and at least one of the first subset of frequency components or the second subset of frequency components; and
transmit one or more reference signals, corresponding to a subset of frequency components included in the set of frequency components, based at least in part on the configuration.

16. The apparatus of claim 15, wherein the first set of reference signals is associated with a first set of beamforming weights, and wherein the second set of reference signals is associated with a second set of beamforming weights.

17. The apparatus of claim 15, wherein the first set of reference signals is quasi co-located with a physical channel on the first subset of frequency components, and wherein the second set of reference signals is quasi co-located with a physical channel on the second subset of frequency components.

18. The apparatus of claim 15, wherein the first subset of frequency components is a single frequency component, and the second subset of frequency components includes the single frequency component and at least one other frequency component.

19. The apparatus of claim 15, wherein the one or more processors are further configured to perform at least one of a beam selection procedure, a beam management procedure, a beam refinement procedure, a beam failure detection procedure, or a beam recovery procedure for the first subset of frequency components or the second subset of frequency components based at least in part on measuring the one or more reference signals.

20. The apparatus of claim 15, wherein one or more reference signal resources, used for transmission of the one or more reference signals, are based at least in part on a variable bandwidth used for communications of a user equipment (UE).

21. The apparatus of claim 15, wherein one or more reference signal resources, used for transmission of the one or more reference signals, are defined by a starting resource block and an ending resource block.

22. The apparatus of claim 15, wherein the one or more processors are further configured to:
transmit an indication of a set of reference signal resources that are included in different sub-carriers of a single orthogonal frequency division multiplexing (OFDM) symbol; and
wherein the one or more processors, to transmit the one or more reference signals, are configured to transmit the one or more reference signals to enable a measurement of frequency variations within the single OFDM symbol using a single radio frequency chain of a user equipment (UE).

23. The apparatus of claim 15, wherein the one or more processors are further configured to:
transmit an indication of a set of reference signal resources in multiple sub-carriers across multiple orthogonal frequency division multiplexing (OFDM) symbols; and
wherein the one or more processors, to transmit the one or more reference signals, are configured to transmit the one or more reference signals to enable a measurement of frequency variations within each OFDM symbol, of the multiple OFDM symbols, using different radio frequency chains of a user equipment (UE) for different OFDM symbols.

24. The apparatus of claim 15, wherein the one or more processors are further configured to:
transmit an indication of a set of reference signal resources in multiple sub-carriers and multiple beams across multiple orthogonal frequency division multiplexing (OFDM) symbols; and
wherein the one or more processors, to transmit the one or more reference signals, are configured to transmit the one or more reference signals to enable a measurement of frequency variations within each OFDM symbol, of the multiple OFDM symbols, using different radio frequency chains of a user equipment (UE) for different OFDM symbols.

25. The apparatus of claim 15, wherein the set of frequency components is a set of component carriers, a set of occupied bandwidths, a set of bandwidth parts, or a set of channelizations.

26. The apparatus of claim 15, wherein the set of frequency components are included in a frequency range included in at least one of a frequency range 2 band or a frequency range 4 band.

27. A method of wireless communication performed by a user equipment (UE), comprising:
receiving a configuration that indicates a set of frequency components corresponding to a plurality of quasi co-location (QCL) mappings, the configuration indicating multiple sets of reference signals,
wherein the configuration associates each set of reference signals, of the multiple sets of reference signals, to different subsets of frequency components included in the set of frequency components, and
wherein the plurality of QCL mappings includes:
- a first QCL mapping between a first set of reference signals, of the multiple sets of reference signals, and a first subset of frequency components, of the set of frequency components,
- a second QCL mapping between a second set of reference signals, of the multiple sets of reference signals, and a second subset of frequency components, of the set of frequency components, and
- a third QCL mapping between a third set of reference signals, of the multiple sets of reference signals, and at least one of the first subset of frequency components or the second subset of frequency components; and monitoring for one or more reference signals, corresponding to the set of frequency components, based at least in part on the configuration.

28. The method of claim 27, wherein the multiple sets of reference signals comprise multiple sets of sounding reference signals, and wherein the configuration includes an indication of a set of sounding reference signal resources according to a variable bandwidth corresponding to the UE.

29. A method of wireless communication performed by a scheduling entity, comprising:
transmitting a configuration that indicates a set of frequency components corresponding to a plurality of quasi co-location (QCL) mappings, the configuration indicating multiple sets of reference signals,
wherein the configuration associates each set of reference signals, of the multiple sets of reference signals, to different subsets of frequency components included in the set of frequency components, and
wherein the plurality of QCL mappings includes:
- a first QCL mapping between a first set of reference signals, of the multiple sets of reference signals, and a first subset of frequency components, of the set of frequency components,
- a second QCL mapping between a second set of reference signals, of the multiple sets of reference signals, and a second subset of frequency components, of the set of frequency components, and
- a third QCL mapping between a third set of reference signals, of the multiple sets of reference signals, and at least one of the first subset of frequency components or the second subset of frequency components; and transmitting one or more reference signals, corresponding to the set of frequency components, based at least in part on the configuration.

30. The method of claim 29, wherein transmitting the one or more reference signals comprises:
transmitting the one or more reference signals to enable a measurement of frequency variations of at least one orthogonal frequency division multiplexing symbol using one or more radio frequency chains.

* * * * *